United States Patent
Sisk et al.

(10) Patent No.: US 12,280,327 B2
(45) Date of Patent: Apr. 22, 2025

(54) VACUUM FILTER ASSEMBLY FOR CLEANSING AIR FOR USE IN TRANSFER OF BULK, GRANULAR MATERIAL AS IN CONVEYING VEHICLES

(71) Applicant: BULK TANK, INC., Park Hills, MO (US)

(72) Inventors: David E. Sisk, Bonne Terre, MO (US); Peter Kemp, Crestwood, MO (US); Roger Breakfield, Farmington, MO (US); Andrew Boyer, Bonne Terre, MO (US); Travis Kinneman, Fredericktown, MO (US)

(73) Assignee: BULK TANK, INC., Park Hills, MO (US)

( * ) Notice: Subject to any disclaimer, the term of this patent is extended or adjusted under 35 U.S.C. 154(b) by 413 days.

(21) Appl. No.: 17/803,366

(22) Filed: May 28, 2022

(65) Prior Publication Data
US 2022/0305418 A1    Sep. 29, 2022

Related U.S. Application Data

(63) Continuation-in-part of application No. 17/300,958, filed on Dec. 22, 2021, now abandoned, and a continuation-in-part of application No. 17/300,841, filed on Nov. 22, 2021, now abandoned, application No. 17/803,366 is a continuation-in-part of application No. 17/300,841, filed on Nov. 22, 2021, now abandoned, which is a continuation-in-part of
(Continued)

(51) Int. Cl.
*B01D 46/00* (2022.01)
*B01D 46/02* (2006.01)

(52) U.S. Cl.
CPC ......... *B01D 46/02* (2013.01); *B01D 46/0004* (2013.01); *B01D 2273/28* (2013.01)

(58) Field of Classification Search
CPC ............... B01D 46/02; B01D 46/0004; B01D 46/0002; B01D 46/04; B01D 46/24; B01D 46/66; B01D 46/70; B01D 46/71; B01D 2273/28
USPC .......... 95/273, 278, 279; 502/301, 302, 303, 502/502
See application file for complete search history.

(56) References Cited

U.S. PATENT DOCUMENTS

| | | | |
|---|---|---|---|
| 4,372,713 A * | 2/1983 | Kean, Jr. | B65G 53/64 55/303 |
| 5,053,063 A | 10/1991 | Sisk | |

(Continued)

*Primary Examiner* — Frank M Lawrence, Jr.
(74) *Attorney, Agent, or Firm* — Sandberg Phoenix & von Gontard, P.C.

(57) ABSTRACT

A dust filtering and collection system for filtering dust and other debris particles from an incoming dust laden air stream, such air stream generally being used for conveying granular material into or from a bulk tank trailer, a railroad car, or other conveying vehicle, the filtering system designed to be functioned by vacuum air pressure, operatively generated by a blower, to draw in the soiled air into the system, to cleanse such air for further use in the conveying of the granular material. The air flow may be reversed, to provide for a dislodging of any dust particles from the filtering system, and to cleanse the filter for further efficient usage of the system in conveying granular material into or out of the tank trailer, or other vehicle during usage.

15 Claims, 3 Drawing Sheets

Related U.S. Application Data application No. 16/873,236, filed on Mar. 2, 2020, now Pat. No. 12,005,551.

(60) Provisional application No. 63/205,694, filed on Jan. 4, 2021, provisional application No. 63/259,241, filed on Jun. 29, 2021, provisional application No. 63/205,346, filed on Dec. 3, 2020, provisional application No. 62/919,379, filed on Mar. 7, 2019.

(56) References Cited

U.S. PATENT DOCUMENTS

| | | | | |
|---|---|---|---|---|
| 6,068,429 | A * | 5/2000 | Schultheis | B65G 53/60 |
| | | | | 406/172 |
| 6,183,529 | B1 * | 2/2001 | Musso | B01D 46/2407 |
| | | | | 55/508 |
| 8,657,898 | B2 | 2/2014 | Sisk | |
| 10,272,378 | B2 * | 4/2019 | Handte | B01D 46/44 |
| 2023/0072328 | A1 * | 3/2023 | Sisk | B01D 46/71 |

* cited by examiner

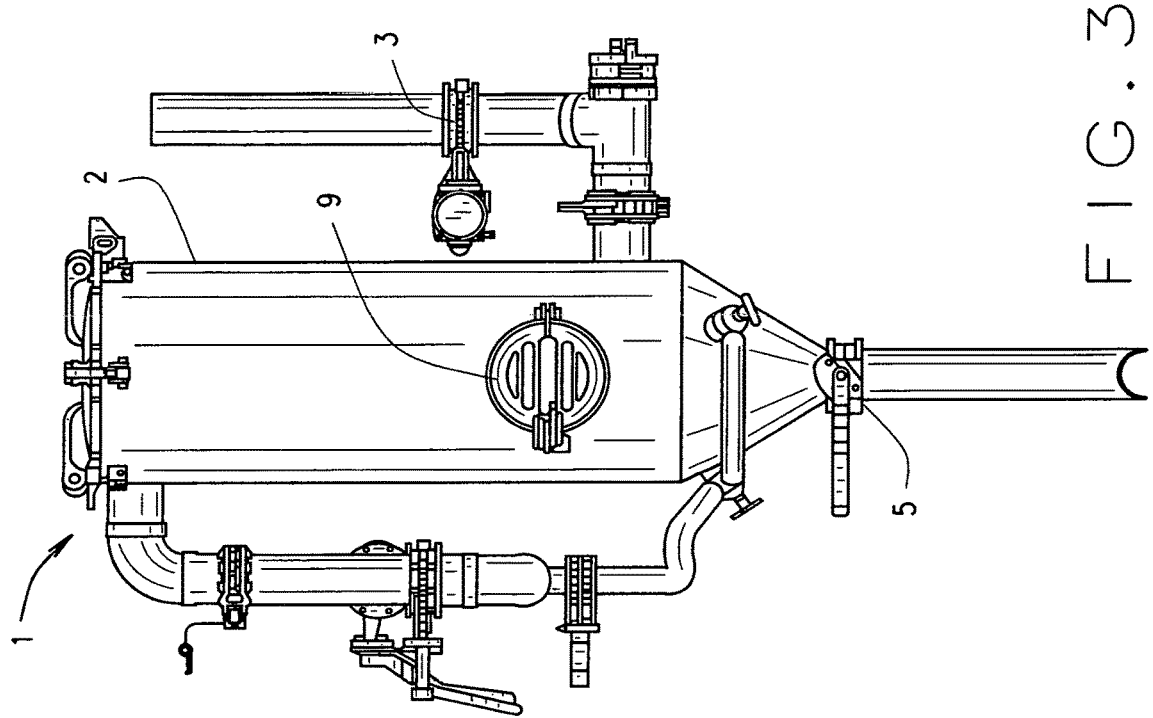
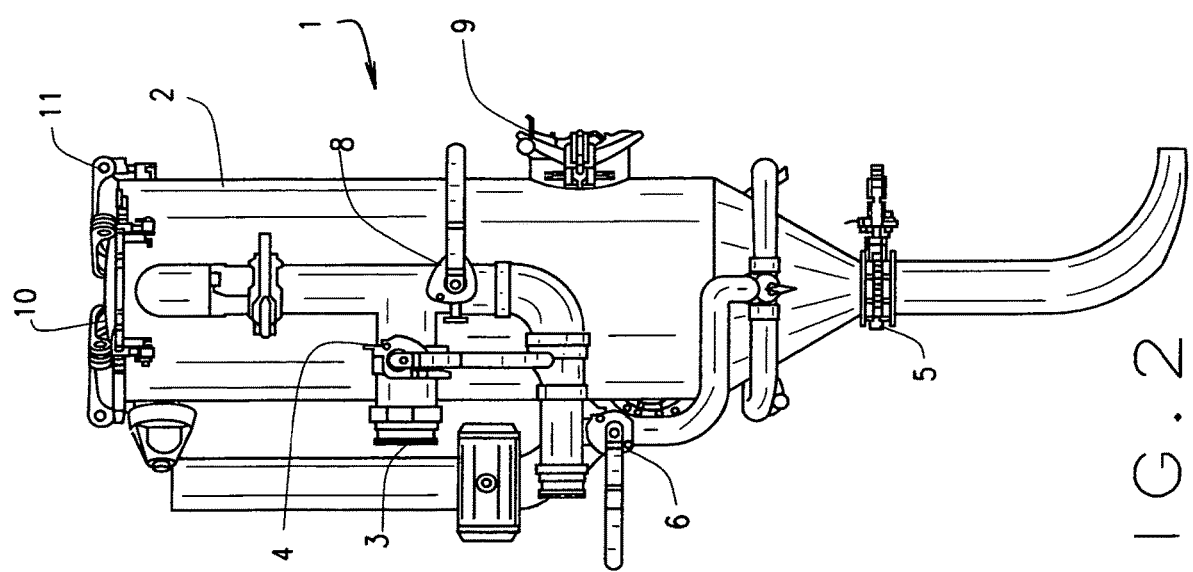

VACUUM FILTER ASSEMBLY FOR CLEANSING AIR FOR USE IN TRANSFER OF BULK, GRANULAR MATERIAL AS IN CONVEYING VEHICLES

CROSS REFERENCE TO RELATED APPLICATIONS

This application is the non-provisional patent application upon the provisional application filed on Jun. 29, 2021, under Ser. No. 63/259,241; this application is also a continuation-in-part of the patent application having Ser. No. 17/300,958, filed on Dec. 22, 2021, and which is the non-provisional for the provisional application having Ser. No. 63/205,694, filed on Jan. 4, 2021; and this application is a continuation-in-part of the application having Ser. No. 17/300,841, filed on Nov. 22, 2021, and which is non-provisional for the application having Ser. No. 63/205,346, filed on Dec. 3, 2020; and this application is a continuation-in-part of the application having Ser. No. 16/873,236, filed on Mar. 2, 2020, which is the non-provisional of Ser. No. 63/919,379, filed on Mar. 7, 2019.

FIELD OF THE INVENTION

This invention relates to various components utilized in an air conveying system and its air filtration system including use of a vacuum control line for providing all of the air movement in the system, to deliver dusty conveying air into the filtration canister, and further includes an exhaust valve that is opened to allow the clean air to be sucked to the blower for use in the conveying of bulk granular material particularly to or from the conveying vehicle, whether it be a tank trailer, railroad car, or other related vehicles for conveying of such materials.

BACKGROUND OF THE INVENTION

The present invention relates to the dust filtering and collection systems for use in the conveyance of bulk materials, of the granular type, and is particularly concerned with the embodiment of the filtration device, or canister, of the type that is used for holding various filtration tubes, and that are utilized for filtering out the dust particles and other miniscule debris from the air that is to be used for such conveyance of granular material into or even from the conveying vehicle, during its usage.

Thus, in previous filtering devices, the filtering of the air that is utilized for moving grain, etc., for conveying purposes, are generally designed for achieving efficiency and separation of the dust and debris from the air being filtered, and for subsequent usage of such cleansed air for conveying granular material, such as the ingredients utilized in food products, so as to maintain the purity and cleanliness in the processing of such grains or other granular materials, in preparation for their application in the formation of food products, and related processed materials, after conveyance from or to its source of usage. More specifically, in the dry bulk conveyance of granular material, such as grains, flour, or the like, where various pressurized air lines are generated to provide for the conveyance of such granular materials, to and from their storage, silos, or conveying bins, such grains, as may be moved to a tank trailer, railroad car, and other dry bulk trailers, it is highly essential that cleanliness of the air being utilized in the conveyance system be highly sanitized, so as to avoid adulterating the transported grains, and eventually, in most instances, as will be utilized in the processing of foods, or even other products, such as polymer pellets, wherein it is absolutely essential that cleanliness be maintained, so as to avoid the contamination of the end product, or other types of products being processed or manufactured from such granular materials.

The present invention relates to the system and process for the vacuum filtering of such conveying air, and more particularly to specific structure for the various components that form the filtration system, and to provide for its functionality, normally through the usage of a singularly air transferring blower, to assure that it maintains efficiency of operation, throughout the useful life of the system, so as to comply with any and all regulations that may be enforced, pertaining to the handling of such type of granular materials, particularly during their conveyance and transfer.

More specifically, with respect to the current invention, that is used within the system including the filtration canister, whether it be one that the air enters directly into the filter housing, or is applied in other manners, the plurality of filtration tubes that have long been used within such filtration systems, are supported normally at their upper ends by a transverse plate, while the lower ends of such tubes are crimped or sealed into closure, and these tubes are made generally of a polymer, that have very miniscule openings through them, in the range of microns of porosity, so as to filter the blower attracted incoming air as it passes through the tubes in the filtration system, and to purify it for further usage in the air conveying of such granular materials, during its handling. And, while such filtration systems, within their filter housing, includes that transverse plate, and in which such tubes are mounted, they usually are each held in place by grommets, that are pressured into position, and it has been found, that these prior art types of filters, that when dust or other fine debris clogs up the porosity of such tubes, and the pressure of the incoming air may be in the range 20-30 psi, on occasion would force the tubes upwardly, out of their engaged grommet, as held within the associated transverse plate, thereby providing a direct opening for passage of the dust soiled air out of the filtration system, bypassing it, and delivering completely adulterated air, which means that it is inadvertently utilized for conveying the granular material and leading to the complete failure of the identified type of filtration system. Such a filtration system can be seen in the assignee's prior U.S. Pat. No. 5,053,063, as can be noted therein.

The previous U.S. Pat. No. 5,053,063, upon the dust filtering and collection system, as noted, shows the overall assembly of the prior art type of assembled structures that make up the storage tank of the dry bulk trailer, including its elongated storage tank, the dust filtering and collection canister associated therewith, and its filtration tubes that are provided within the canister, in addition to the flow paths or the various air lines that provide for conduct of the dust laden air stream into the filtering canister, and then through the filtration device, and the other flow lines associated with the conveyance of the purified air to the primary discharge line that utilizes pressurized air to convey the granular material or grains for loading onto the tank trailer, or railroad car, and to the site of its usage or storage. That previous disclosure provides an overall analysis of the bulk tank vehicle storage tank, and its various air conveying lines, and the filtration device used therein, during its processing of granular material.

Other United States patents, even to one of the inventors herein, U.S. Pat. No. 8,657,898, also depict an air filter spin flow type of housing, which shows a separate type of structure for filtering of the air used in the conveying of bulk granular materials from a tank trailer, such as the type that also uses air pressure to achieve granular or grain flow, and its distinct air filtration unit incorporating an intake that induces, in that instance, a spiral air flow, upon entering of its associated filtering device.

These are the most pertinent prior art patents that are known to the inventors herein. These show various filtration systems, that are designed for aiding in the cleansing of the air, through a filtration canister, in order to provide clean air for use in the conveyance of the bulk granular materials being processed and conveyed.

SUMMARY OF THE INVENTION

The primary concept of this invention is to provide improvements in the functionality of a filter canister, incorporating a plurality of filtration means, that are used to filter the dust laden air that is vacuumed into the filter canister, to allow for cleansing of the air, and then utilizing an exhaust valve that is opened to allow the clean air to be sucked to the system blower, that is applied for increasing the pressure and forcing the pressurized air to aid in the conveyance and loading or unloading of the granular material onto the associated vehicle, during its functioning. Then, the dust collected usually at the bottom of the filter canister, allows when opened the dust to be pneumatically conveyed, that generally removes the dust from the filtration device, and after its removal, by the filter, from the incoming air that is now refreshed and available for usage in aiding in the conveying of such granular materials. To clean the filter elements of the canister, a back flush valve is opened, allowing air to be conveyed in an opposite direction, through the filtration tubes, to unclog the dust from the filter, in preparation for its further more efficient usage in filtering of the incoming air, for subsequent usage of said clean filtered air in the vehicle conveying system.

Actuators may be applied to the various valves that are operatively associated with the filter canister, and the various vacuum and air lines, in addition to exhaust lines, so that the entire system can be remotely and automatically operated, to provide for cleansing of the filter canister, and its various filtration tubes, during their usage and operation.

Thus, the vacuum filter canister of this invention is outfitted with various control valves, whether it be an aeration control valve, dust collection valve, exhaust valve, vacuum connection, a back flush valve, all to provide for the automated operation of the filter canister, during its application and usage, to assure that more pure and clean air is always available, for use in the conveyance of such bulk granular materials through operations of this system. The vacuum filter canister is outfitted with such control valves to allow the filter to be operated in different modes, as previously commented. The canister can function as a vacuum filter, or as aerators to allow the canister to be pressurized to unload the dust into the trailer or silo, and the canister can be used as a dust collector when loading pneumatically the trailer from the pressurized silo, that stores the granular material prior to its conveyance to the conveying vehicle. The canister can also incorporate various outlet pressures to pass the air through the filter, in the opposite direction, in order to purge the various filter tubes of accumulated or unclog the dust particles, that reduces the efficiency of filtration of the air, during its cleansing.

The system also includes various styles of grommets, that can be snapped into the transverse plate holds a variety of the filtration tubes, as previously described, to assure that the grommets hold the tubes in position, even when subjected to very high air pressures, during functioning of the filtration system. Such tube grommets have retention features that holds the tubes, to the grommets, and the grommets to the filter tube sheet, to assure that it keeps the tubes from being pushed or forced out, when subjected to significant high pressures, of the conveying air, during usage of the vacuum filter assembly of this invention.

In summary, the vacuum filter canister of this invention, as used with the conveying vehicle is outfitted with the various control valves, as aforesaid, to allow the filter to be operated in its variety of modes, whether it be for delivering dusty air to the filter assembly, in preparation for purging, and then delivering the cleansed air to the vacuum connection that delivers such air to be sucked to the blower, that forces the air through the conveying lines of the system, for use in the unloading of the granular material either from the silo onto the vehicle, or from the vehicle to another source for use or storage of such conveyed materials.

Thus, the principal object of this invention is to provide means for a system for the vacuum loading, pressure loading, dust recycling, for the conveyance of dusty and debris laded air to a filter canister, operatively associated with the conveying vehicle, to initially deliver such air to the filter for cleansing, passing the air through the various filtration tubes for cleansing, and utilizing a vacuum control line for moving the cleansed air to the normally singular blower, that subjects the air to enhanced pressure that is used for aiding in the conveying of the granular material, as noted, to or from the conveying vehicle.

Another object of this invention is to provide for not only the cleansing of soiled air through a vacuum filter canister, but also to allow for purging of the filtration tubes of the canister, when such tubes become clogged with debris and dust, and need to be cleansed, for further delivery and usage in efficiently performing the materials conveying function of the system.

A further object of this invention is to provide various means for holding the filtration tubes to their associated transverse plate, of the filtration canister, to assure that when the tubes are subjected to pressurized air, they are not forced open thereby destroying the filtering attributes of the system, during its usage.

These and other objects may become more apparent to those skilled in the art upon review of the Summary of the Invention as provided herein, and upon undertaking a study of the Description of its Preferred Embodiment, in view of the Drawings.

BRIEF DESCRIPTION OF THE DRAWINGS

In referring to the drawings:

FIG. 2 is a front view of the vacuum filter assembly, of FIG. 1;

FIG. 3 is a right side view of the vacuum filter assembly;

DESCRIPTION OF THE PREFERRED EMBODIMENT

Figure 1:
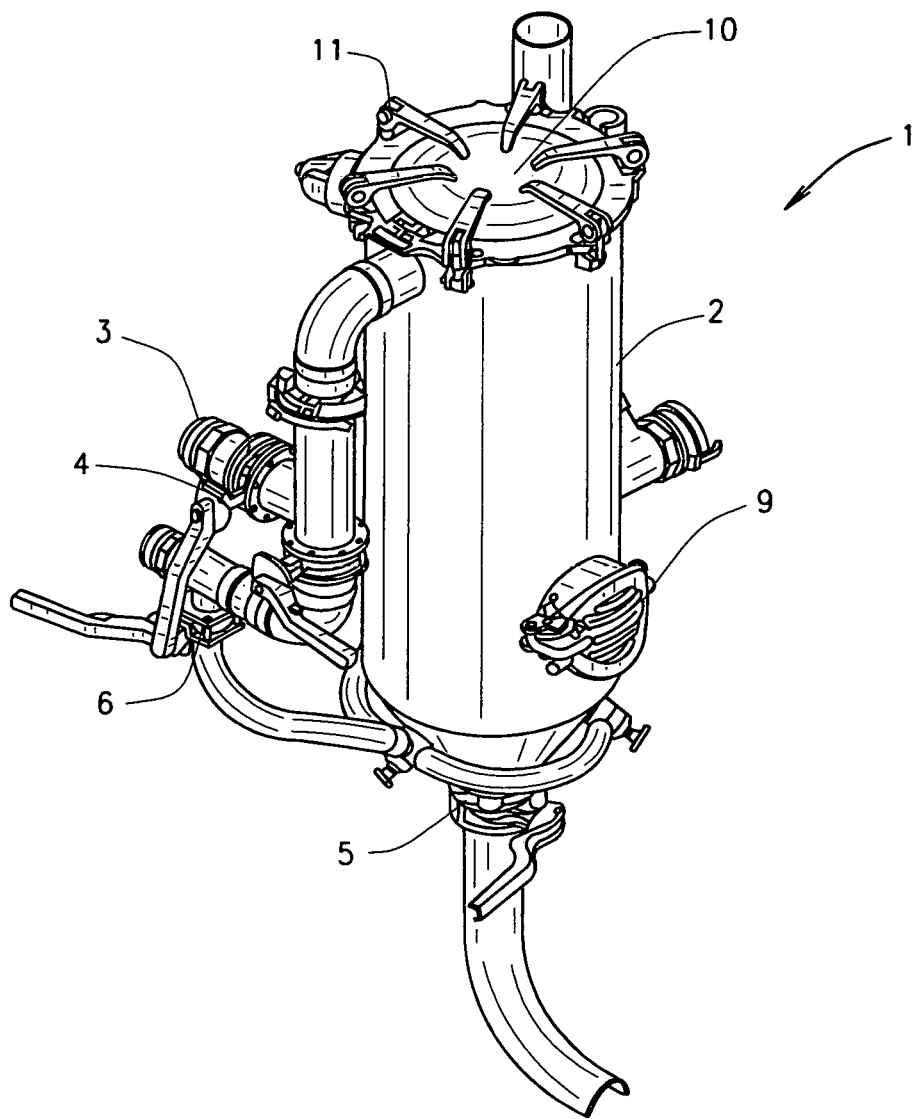
FIG. 1 provides an isometric view of the vacuum filter assembly of this invention.

As can be seen in FIGS. 1-3 of the drawings, the vacuum filter assembly 1 of this invention for cleansing air for use in transfer of bulk granular material in conveying vehicles, such as a bulk tank trailer or railroad car, or other conveying vehicle (not shown) is readily disclosed. It includes its filter canister 2 which has a variety of air conveying lines operatively associated therewith, as to be explained. Initially, a vacuum connection 3 connects with its shown port which is in communication with the blower (not shown) that delivers the clean air by suction to the blower system, that generates the clean air through filtration that is used for conveyance of the granular material either to or from the conveying vehicle, as explained. The vacuum control line is opened to allow the attraction of dusty air into the filter canister 2, and there is an exhaust valve 4 that is opened to allow clean air to be sucked towards the blower, for further usage, after the dusty air has been drawn into the filter canister, to be subjected to its cleaning filtration process.

To load the vehicle trailer pneumatically, from the pressurized silo holding the granular material, the vacuum control line is opened to allow the dusty air to be drawn into the filter canister, and the exhaust valve is opened to allow the clean air to be sucked out of the filter canister, and to the blower for its application for conveying purposes.

To recycle the dust collected, as at the vicinity of its dust collection valve 5, provided at the bottom of the filter canister 2, the aeration valve 6 is opened, and the canister is pressurized to fluidize the dust and allow it to be pneumatically conveyed either for disposal or collection for further usage. The dust collection valve 5 is opened, to remove the dust from the bottom of the canister, as can be understood.

Figure 4:
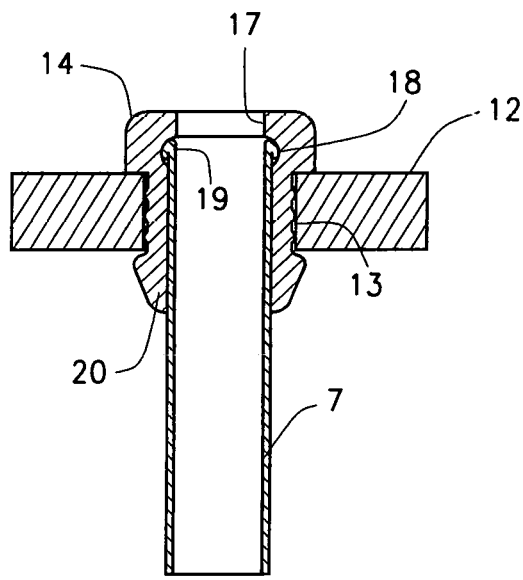
FIG. 4 shows a sectional view of the grommet holding a filtration tube to the transverse plate within the filter canister of the assembly.

To clean the filter elements, such as the filtration plurality tubes 7 (see FIG. 4), a back flush valve 8 is opened allowing air to flow in the opposite direction through the filter, to unclog the filtration tubes 7, of the type as previously explained having micron openings to function for filtration purposes. This unclogs the dust from within the filtering openings, allows the dust to drop down to the vicinity of its dust collection valve, where it then can be removed, as previously explained.

As previously reviewed, various types of actuators, whether they be electronically controlled, or mechanically operated, can be fitted to the various valves, as described, and through the usage of a system of relays and switches, can control the valves for automated operation. Or, even a computer control can be used to fully automate the operations of the system, which may be controlled from the dashboard in the vicinity of the vehicle operator, or even located somewhere externally upon the filtration system, to automate the operations of the filtration system, during its usage.

As can also be seen in FIG. 1, there is a high pressure inspection door, as at 9, where visual inspection can be made interiorly of the filter canister 2, after curtailment of its operations, to see if its various operative components are in satisfactory condition, for further usage and application.

On the top of the filtration canister 2 is a high pressure cover 10 which can be locked in position by means of a series of cam locks 11 to assure that the cover remains intact during operations of the filtration system, even when subjected to high pressures, during its functioning.

In other words, the concept of this vacuum filter assembly is to provide the usage and application of a vacuum port, that connects by conduit to a single blower, that generates sufficient high pressure vacuum, in the manner as previously described, for drawing soiled air into the filter canister of the filtration system, passing the air through the various porous filtration tubes, to separate any dust and debris, from the air, and then drawing the cleaned air to the blower, where it is forced into the conveying lines to aid in the removal of the granular material either to or from the conveying vehicle, during its operations. This assures that only unadulterated clean air is used in this conveying process, and does not soil the types of granular materials that are being conveyed, during its usage. A back flush valve is utilized to provide for this reverse in the flow of the air, when the filtration tubes are being subject to reverse flow of air, to dislodge the dust and debris, during their cleansing process when that segment of the filtration system is rendered functional for cleaning purposes.

Figure 5:
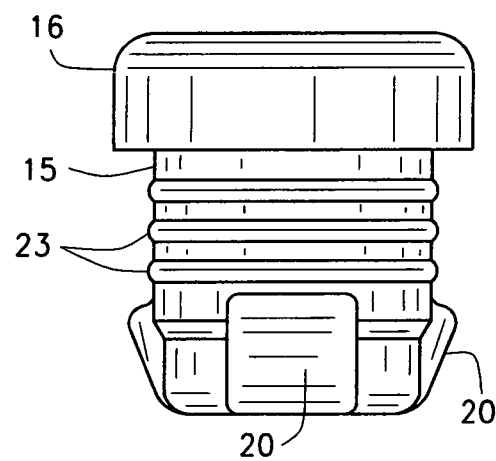
FIG. 5 is a side view of the grommet holding the filtration tube to the transverse tube sheet.
Figure 6:
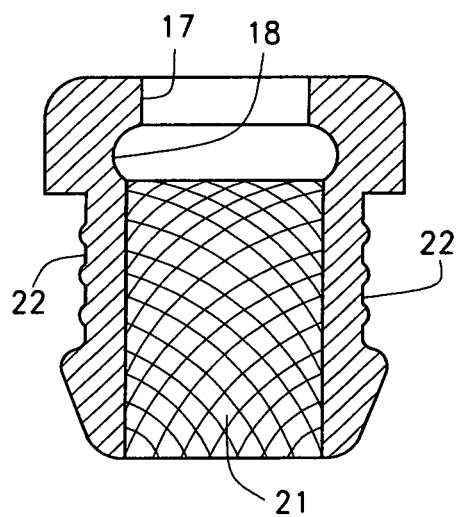
FIG. 6 is a sectional view of the grommet for use for holding a filtration tube to its tube sheet.
Figure 7:
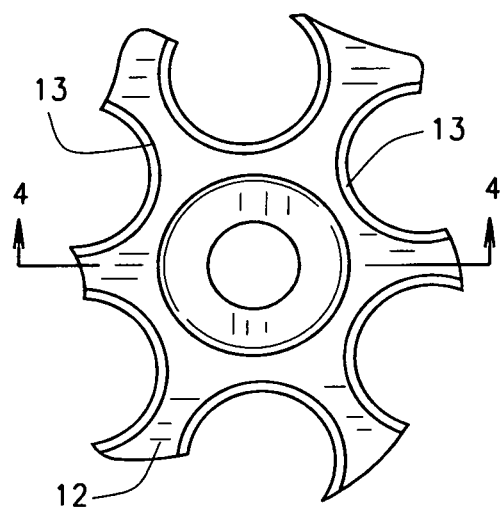
FIG. 7 shows a portion of the transverse plate, and one of the grommets, in place, for holding a filtration tube within the assembly.

The specific structure of the filtration system, provided within the filter canister 2, can be seen in FIGS. 5-7. As noted, and as previously shown in earlier patents to select of the inventors herein, at the upper segment of the filter canister 2 is a transverse tube sheet 12 which has a series of apertures, as at 13, provided therethrough, and which receives a particular designed grommet 14 that is designed to provide for the hold of its associated filtration tube 7, of the type as previously described. A preferred filtration tube is one identified as a Poron tube, that is supplied by a company. These tubes are generally constructed such that air may pass through the 40-50 micron porosity openings in its outer walls, passed through tortuous paths or openings, in the tube wall, and then be constricted to a 2.5 micron opening along the inner wall of the tubes, for filtering purposes. Both these polyethylene and "Teflon" tubes keep the dust particles off the outer surface of the seamless polymer tubes, with the polymer having more lubricity, thus making it more difficult for dust particles to accumulate on the outer wall surface of the hollow polymer tubes during filtration processes. Obviously, many such tubes are connected to the tube plate.

Since previous filtration systems utilizing fasteners to hold tubes to the tube sheet, when subjected to the high pressures of this filtration system, which would force the grommets out of the tube sheet, the grommet of this development is especially designed to provide for interlocking of it with the tube sheet, and at the same time, provide for an interlocking connection between the filter tube, and its grommet, to prevent such disconnection during a filtration process. As can be seen, each grommet has a downwardly extending integral sleeve, as at 15 and into which the filter tube 7 locates, as noted. And, the upper end of each grommet has an integral flange 16, with an air passing opening 17 provided through its upper segment, as noted. The flange has an internal groove 18 which engages within it the upper flange 19 of the filtration tube 7. That interlocks these two components together. Then, the bottom of the grommet has one or more integral detents, as at 20, that secure under the bottom of the tube sheet 12, and therefore, in combination with the flange 14, secures each grommet to the said tube sheet. And, since the tube 7 locates through the opening of the grommet, it interlocks all of these components together, to resist any excessive air pressure from trying to dislodge these components from each other, once assembled into the formation of the filtration assembly, of the shown and described system. The interior of the opening of the grommet, as can be seen in FIG. 6, may be knurled, as noted at 21, and for the purpose of providing a further frictional grip between the filter tube 7 provided therein, when the tube is located within the grommet, before it is forced through the opening 13 of the tube sheet, during its assembly.

The filter tube grommet has these retention features to hold the tubes to the grommet and the grommet to the filter tube sheet, when utilized. The grommet has that internal groove 18 that keeps the tube from being pushed out, upwardly, when installed during usage. And, the tabs or minor flanges 19 around the upper edge of the tube prevent the grommet and tube from pushing out of the tube sheet. Thus, when assembled, these components are interlocked together, to assure that they maintain their secured integrity, when exposed to high pressure air during operations of this filtration system.

At the approximate midpoint of the sleeve like portion 15 of each grommet, are a series of annual grooves, as noted at 22, and these are designed for holding various O-rings 23 sealed against the inner surfaces of the tube sheet 12, to prevent the bypass of any soiled air, from the filter tubes, during operations of the system.

Variations or modifications of the subject matter of this invention may occur to those skilled in the art upon review of the development as provided herein. Said variations, if within the spirit of this invention, are intended to be encompassed within the scope of any claims to patent protection issuing herein. The explanation of the invention in the Description of the Preferred Embodiment, and its specific structure for achieving of its beneficial results, and as depicted in the Drawings, are generally set forth for illustrative purposes only.

We claim:

1. A dust filtering and collection system for use in a multiple loading/unloading vehicle tank trailer, said system for use in removing granular material by way of an air conveying source to and from the vehicle tank trailer, the system comprising:
    a filter housing, said filter housing having an upper end and a lower end, an air inlet proximate the lower end of said filter housing, and an air outlet proximate the upper end of said filter housing;
    a dust filtering system suspended within said filter housing, a transverse plate provided in an upper segment of said filter housing, and at least one filtration tube suspended from the transverse plate and extending downwardly into the filter housing, a grommet extending through the transverse plate and holding the at least one filtration tube suspended from the transverse plate;
    a vacuum connection connected to the filter housing, said vacuum connection connecting with a blower assembly, said air inlet provided for delivery through a vacuum generated by the blower assembly of dust laden air into the filter housing, whereby when said blower assembly is actuated for generating a vacuum within the filter housing, the vacuum draws dust laden air into the dust filtering system which provides for cleaning of the dust laden air and passage of clean air to the blower assembly for then aiding in air conveyance of the granular material to and from the vehicle tank trailer during functioning of the blower assembly;
    a back flush valve provided connecting with an incoming airline, to provide for a reversal of pressurized air through the filter housing of the filtering system to extract any accumulated dust particles from the filtration tubes and to provide for further efficient generation and application and usage of the conveying air.

2. A dust filtering and collection system of claim 1, and including a high pressure inspection door provided upon the filter housing to provide for visual inspection of the interior of said housing after curtailment of its operations.

3. A dust filtering and collection system of claim 2, and including an exhaust valve provided connecting with the conveying source that conveys granular material to and from the vehicle tank trailer, and which when opened allows for clean air to be sucked toward the blower for further usage in the granular material conveying system.

4. A dust filtering and collection system of claim 1 and including a high pressure cover provided upon the top of the filter housing and a series of cam locks, the series of cam locks being operable to lock the high pressure cover upon the top of the filter housing.

5. The dust filtering and collection system of claim 3 wherein the said back flush valve and the exhaust valve are manually operative.

6. A vacuum filter assembly for a tank trailer comprising:
    a filter canister, the filter canister having a top of the filter canister and a bottom of the filter canister, a dusty air inlet on the filter canister proximate the bottom of the filter canister and a clean air outlet on the filter canister proximate the top of the filter canister;
    a dust filtering system suspended in the filter canister, the dust filtering system comprising a tube sheet traversing an upper segment of the filter canister and at least one filtration tube suspended from the tube sheet and extending downward into the filter canister;
    a grommet extending through the tube sheet, the grommet being connected to the at least one filtration tube and the grommet being connected to the tube sheet;
    a vacuum connection connecting the clean air outlet on the filter canister to a blower assembly, the blower assembly being operable to generate a vacuum in the filter canister and draw dust laden air through the dusty air inlet on the filter canister into the bottom of the filter canister and through the dust filtering system cleaning the dust laden air in response to operation of the blower assembly;
    a back flush valve on an incoming airline communicating with the clean air outlet on the filter canister, the back flush valve being operable to open and communicate an air flow in an opposite direction through the at least one filtration tube of the dust filtering system and unclog dust from the at least one filtration tube.

7. The vacuum filter assembly of claim 6, further comprising:
    a high pressure inspection door on the filter canister, the high pressure inspection door being configured to enable a visual inspection of an interior of the filter canister through the high pressure inspection door.

8. The vacuum filter assembly of claim 6, further comprising:
    an exhaust valve operatively connected to the clean air outlet of the filter canister, the exhaust valve being configured to be opened and communicate the clean air outlet with the blower assembly.

9. The vacuum filter assembly of claim 6, further comprising:
    a high pressure cover on the top of the filter canister; and
    a plurality of cam locks on the high pressure cover, the plurality of cam locks being configured to lock the high pressure cover on the top of the filter canister.

10. The vacuum filter assembly of claim 8, further comprising:
    the back flush valve being configured for manual operation; and
    the exhaust valve being configured for manual operation.

11. A vacuum filter assembly comprising:
a filter canister, the filter canister having a top of the filter canister and a bottom of the filter canister;
a dusty air inlet on the filter canister at the bottom of the filter canister;
a clean air outlet on the filter canister at the top of the filter canister;
a dust filtering system in the filter canister, the dust filtering system comprising a tube sheet traversing an upper segment of the filter canister and at least one filtration tube suspended from the tube sheet and extending downward into the filter canister;
a blower assembly;
a vacuum connection connecting the clean air outlet on the filter canister with the blower assembly, the blower assembly being operable to create a vacuum that is communicated through the vacuum connection and the clean air outlet on the filter canister to an interior of the filter canister to draw dust laden air through the dusty air inlet on the filter canister into the bottom of the filter canister and through the at least one filtration tube of the dust filtering system cleaning the air in response to operation of the blower assembly; and
a back flush valve communicating with the vacuum connection and the clean air outlet on the filter canister, the back flush valve being operable to open and communicate an air flow in an opposite direction through the clean air outlet and the at least one filtration tube of the dust filtering system to unclog dust from the at least one filtration tube.

12. The vacuum filter assembly of claim 11, further comprising:
a high pressure inspection door on the filter canister, the high pressure inspection door enabling visual inspection of an interior of the filter canister through the high pressure inspection door.

13. The vacuum filter assembly of claim 11, further comprising:
an exhaust valve connected in communication with the clean air outlet of the filter canister, the exhaust valve being operable to be opened and communicate the clean air outlet with the blower assembly.

14. The vacuum filter assembly of coin 12, further comprising:
a high pressure cover on the top of the filter canister; and
a plurality of cam locks on the high pressure cover, the plurality of cam locks being selectively operable to lock the high pressure cover on the top of the filter canister and to unlock the high pressure cover from the top of the filter canister.

15. The vacuum filter assembly of claim 13, further comprising:
the back flush valve being a manually operated valve; and
the exhaust valve being a manually operated valve.

* * * * *